(12) United States Patent
Rabaiotti et al.

(10) Patent No.: US 12,392,675 B2
(45) Date of Patent: Aug. 19, 2025

(54) SENSOR DEVICE FOR MEASURING A FLUID PRESSURE, AND METHOD FOR MANUFACTURING A SENSOR DEVICE

(71) Applicant: PROF. DR. CARLO RABAIOTTI OST—OSTSCHWEIZER FACHHOCHSCHULE, Rapperswil (CH)

(72) Inventors: Carlo Rabaiotti, Zollikerberg (CH); Alessio Höttges, Zürich (CH); Massimo Facchini, Zürich (CH); Daniel Schwendemann, Pfullendorf (DE); Silvan Walker, Altendorf (CH)

(73) Assignee: PROF. DR. CARLO RABAIOTTI OST—OSTSCHWEIZER FACHHOCHSCHULE, Rapperswil (CH)

( * ) Notice: Subject to any disclaimer, the term of this patent is extended or adjusted under 35 U.S.C. 154(b) by 0 days.

(21) Appl. No.: 18/850,184

(22) PCT Filed: Mar. 24, 2023

(86) PCT No.: PCT/EP2023/057677
§ 371 (c)(1),
(2) Date: Sep. 24, 2024

(87) PCT Pub. No.: WO2023/180544
PCT Pub. Date: Sep. 28, 2023

(65) Prior Publication Data
US 2025/0109999 A1  Apr. 3, 2025

(30) Foreign Application Priority Data
Mar. 25, 2022  (DE) .................... 10 2022 107 179.0

(51) Int. Cl.
*G01L 11/02* (2006.01)
*G01L 9/00* (2006.01)

(52) U.S. Cl.
CPC .......... *G01L 9/0007* (2013.01); *G01L 9/0032* (2013.01); *G01L 11/025* (2013.01)

(58) Field of Classification Search
None
See application file for complete search history.

(56) References Cited

U.S. PATENT DOCUMENTS

| 4,524,436 A | 6/1985 | Hall et al. |
| 6,882,595 B2 | 4/2005 | Woo |

(Continued)

FOREIGN PATENT DOCUMENTS

| CN | 107003192 A | * | 8/2017 | ........... G01D 5/3538 |
| GB | 2303445 A | | 2/1997 | |
| JP | 2008-175560 A | | 7/2008 | |

OTHER PUBLICATIONS

English Translation of CN-107003192-A (Year: 2017).*

(Continued)

*Primary Examiner* — Alexander A Mercado
(74) *Attorney, Agent, or Firm* — Posz Law Group, PLC

(57) ABSTRACT

A sensor device, at least for measuring a fluid pressure, has a base body and has a fibre optic sensor unit which includes one or more sensor elements(s) which is in the form of a light conducting fibre and which extends along a longitudinal extension of the base body at least substantially helically around the base body. A transmission unit, which is arranged in at least one measuring range around the base body and the one or more sensor elements(s), receives a fluid from an environment and transmits a fluid pressure to the sensor unit for a deformation of the at least one sensor element.

16 Claims, 7 Drawing Sheets

(56) References Cited

U.S. PATENT DOCUMENTS

Figure 1:
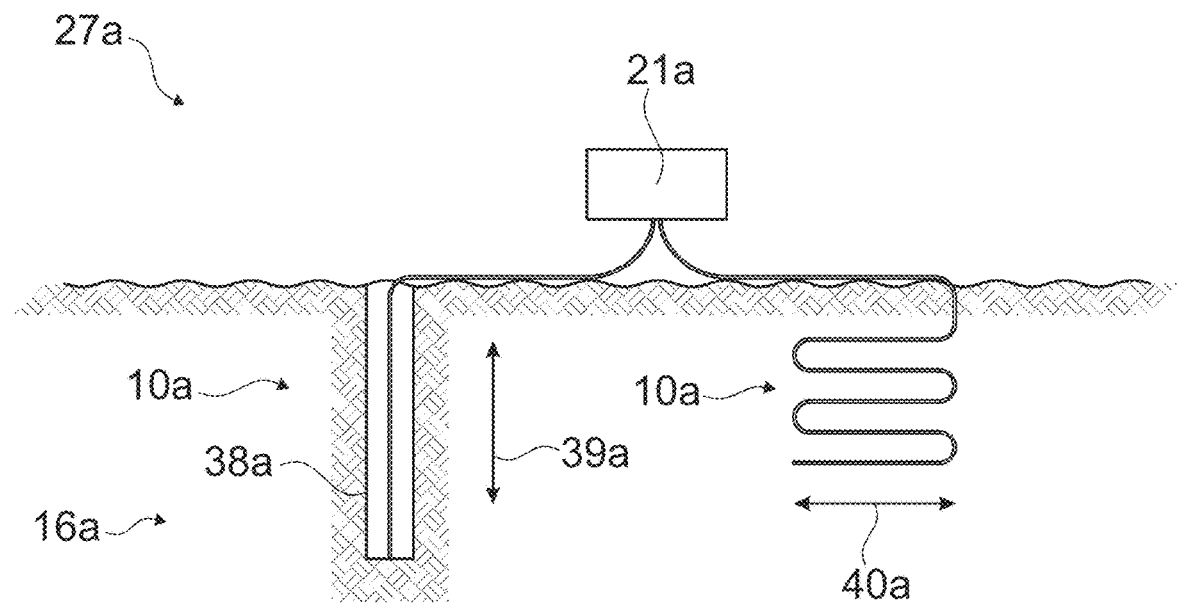

2004/0184352 A1　9/2004　Woo
2006/0071158 A1　4/2006　Van Der Spek
2013/0034324 A1　2/2013　Laing et al.

OTHER PUBLICATIONS

German Search Report dated Jan. 23, 2023 for the corresponding German Patent Application DE102022107179.0 (and English translation).
International Preliminary Report on Patentability dated Mar. 22, 2024 for the corresponding International Patent Application No. PCT/EP2023/057677.
International Search Report dated Jul. 6, 2023 for the corresponding International Patent Application No. PCT/EP2023/057677.

\* cited by examiner

SENSOR DEVICE FOR MEASURING A FLUID PRESSURE, AND METHOD FOR MANUFACTURING A SENSOR DEVICE

CROSS-REFERENCE TO RELATED APPLICATIONS

This patent application is a U.S. national stage application of international patent application PCT/EP2023/057677, filed on Mar. 24, 2023, which is based on and claims priority to German patent application DE 10 2022 107 179.0, filed on Mar. 25, 2022, the contents of which are incorporated herein by reference.

STATE OF THE ART

The invention relates to a sensor device at least for measuring a fluid pressure, a sensor system, a use of the sensor device, and a method for manufacturing the sensor device.

A sensor device for measuring a pressure, having a base body and having a fibre-optic sensor unit which comprises at least one sensor element which is in the form of a light-conducting fibre and extends along a longitudinal extension of the base body at least substantially helically around the base body, has already been proposed.

The object of the invention is in particular to provide a generic device having improved properties with regard to a measuring accuracy and/or a, in particular specific, measuring method. The object is achieved according to the invention.

ADVANTAGES/DISCLOSURE OF THE INVENTION

The invention is based on a sensor device at least for measuring a fluid pressure, having a base body and having a fibre-optic sensor unit which comprises at least one sensor element which is in the form of a light-conducting fibre and extends along a longitudinal extension of the base body at least in sections at least substantially helically around the base body.

It is proposed that the sensor device has a transmission unit which is arranged in at least one measuring range around the base body and the at least one sensor element and is configured to receive a fluid from an environment and to transmit a fluid pressure to the sensor unit for a deformation of the at least one sensor element. The fluid pressure can thereby advantageously be determined in the environment, in particular in a soil, independently of a mechanical pressure of a substance which is different from a fluid, in particular of a solid body, for example of a rock or an earth of the soil. A particularly high measuring accuracy can particularly advantageously be achieved. In particular, the base body is formed by a, in particular dimensionally stable, for example round or polygonal, preferably axially extended, hollow profile, in particular a pipe or a hose. In particular, the base body is configured to receive and/or to guide and/or to position the sensor unit on an outer diameter of the base body. The base body is preferably realized to be deformable by a pressure application, in particular the fluid pressure. In this context, deformable is intended to mean in particular that a change in the geometric variable, in particular the diameter and/or the length, takes place/is made possible on account of a pressure application, in particular a fluid pressure application. In particular, the base body is at least partially hollow in an interior. However, it is conceivable for an elastic filling, in particular a foam and/or an elastomer, to be arranged in the interior. In particular, the base body could be in the form of a solid body. In particular, the base body could be formed completely from the foam. It is also conceivable for the base body to be formed from two or more, in particular nested, hollow profiles, wherein an outer diameter of an inner hollow profile preferably substantially has the inner diameter of an outer hollow profile. It is conceivable for the contact surfaces between the hollow profiles and/or the foam filling to be at least substantially connected to an adhesion promoter. The base body, in particular the hollow profile, preferably the pipe, preferably has a wall thickness of at least 0.5 mm, preferably at least 1 mm, preferably at least 2 mm, advantageously at least 4 mm and particularly preferably at most 10 mm. The base body preferably has an outer diameter of at least 3 mm, preferably at least 6 mm, preferably at least 8 mm, advantageously at least 12 mm, particularly advantageously at least 18 mm and particularly preferably at most 25 mm. The base body, in particular the hollow profile, preferably the pipe, is preferably formed from an elastically deformable plastic, in particular from a thermoplastic elastomer, and/or an elastically deformable metallic material, in particular aluminium or steel. It is also conceivable for the base body to be formed from an elastically deformable composite material, in particular a carbon fibre composite material. The material of the base body preferably has a low stiffness, in particular with a modulus of elasticity of less than 210,000 megapascals, preferably less than 100,000 megapascals, advantageously less than 10,000 megapascals, particularly advantageously less than 1,000 megapascals, preferably less than 100 megapascals and particularly preferably greater than 1 megapascal. In particular, the material of the base body has a pronounced elasticity at least in a temperature range from −50° C. to +300° C. In particular, "configured" should be understood to mean specially programmed, designed and/or equipped. In particular, the fact that an object is configured for a specific function should be understood to mean that the object fulfills and/or performs this specific function in at least one application and/or operating state.

The light-conducting fibre can be formed as a plastic-coated glass fiber, in particular glass fiber. Alternative fiber materials such as plastics (POF polymer optical fibers) or photonic crystal fibers (PCF) are also conceivable. In particular, light introduced into the light-conducting fiber, in particular pulsed or continuous light, is scattered, in particular backscattered. The backscattered signal can then serve as a measurement signal. In particular, the backscattering of the light-conducting fiber is dependent on a state of expansion and/or compression of the light-conducting fiber. As a result, a pressure-induced expansion and/or compression of the light-conducting fiber of the sensor element introduced into the soil and therefore a pressure prevailing at the measurement location, in particular fluid pressure, can advantageously be inferred. In this case, it is conceivable for interference patterns, which are also referred to as fiber Bragg grating (FBG), to be introduced in the longitudinal direction of the light-conducting fiber, in particular at defined intervals, said interference patterns reflecting light of a defined wavelength introduced into the light-conducting fiber. In this case, in particular, an expansion and/or compression of the glass fiber leads to a change in length of the distances between the interference patterns, or to a change in the optical properties of the individual interference patterns, which change a measurement signal, in particular the wavelength of the reflected light. In principle, however, a scattering of the light-conducting fiber which is independent of interference patterns can also be used to determine the measurement signal. The light-conducting fiber can therefore also be formed free of interference patterns. It is conceivable for a sensor unit to have a plurality of sensor elements, in particular a plurality of light-conducting glass fibers.

The sensor element is preferably arranged in a helical manner on an outer circumference of the main body. In this case, the expression "helical" should be understood to mean, in particular, an angle with respect to the circumferential direction of the main body running around a circumference of the main body. In this case, a sign of the angle with respect to the circumferential direction of the main body can be positive or negative. In particular, the sign of the angle with respect to the circumferential direction of the main body defines whether a winding direction of the helical form is formed in the left-hand or right-hand direction. In particular, helical also means helical and/or thread-like. The sensor element, in particular the light-conducting fiber, is preferably wound in a helical manner around the main body. In particular, the smaller the angle of the sensor element with respect to the circumferential direction of the main body is formed, the smaller the axial length and/or the axial spacing of a fiber wrap of the light-conducting fiber along the hollow profile, which is referred to as lay length. In particular, the light-conducting fiber can be wound with a left-hand or a right-hand turn around the base body, in particular as seen from a measuring end of the light-conducting fiber. The sensor element is preferably configured to determine a fluid pressure, in particular a spatially resolved fluid pressure, in particular a liquid pressure and/or water pressure and/or pore pressure, in an environment, in particular in a soil. In order to measure the fluid pressure in a soil, the sensor device is buried at least in sections in the soil and/or introduced into the subsoil. The sensor element is preferably expanded and/or compressed in the case of a fluid pressure application. In particular, the optical transmission and/or reflection properties for light guided in the sensor element change in a location-dependent manner as a result of the, in particular local, expansion/compression. The sensor element generates, in particular from the location-dependent optical properties of the prescattering and/or backscattering, or of the optical transmission and/or reflection, a measurement signal from which a local pressure, in particular the local fluid pressure in the soil, can be derived. The sensor element, in particular the light-conducting fibre, preferably extends at least substantially over the entire length of the sensor device. The sensor device can have lengths of a plurality of meters, for example approximately 10 m, approximately 50 m, approximately 100 m or approximately 250 m or even up to a plurality of kilometers, for example up to 30 km or up to 50 km. However, shorter sensor devices are of course also conceivable. The sensor unit preferably has a casing element which surrounds the sensor element. The casing element is preferably formed from an elastic plastic, in particular a thermoplastic elastomer or a comparable material with pronounced elasticity. In particular, the casing element is of flexible design. In particular, the casing element is of adhesive design with the base body, in particular the pipe. The casing element is preferably configured to protect the sensor element, in particular against an application of dirt, corrosive media and/or damage, and/or to realize an at least substantially undistorted transmission of force and/or pressure to the sensor element. In particular, the casing element is of fluid-tight design, in particular water-tight and/or impermeable to water.

In particular, the sensor device forms the measuring range. In particular, the measuring range is designed as a region of the sensor element in which a fluid pressure is detected. In particular, the transmission unit extends at least over the measuring range. The measuring range is preferably spanned by the longitudinal extension of the transmission unit and a circumference of the hollow profile. In particular, a length of the measuring range can correspond approximately to a length of the sensor device and/or of the main body. However, it is also conceivable for the measuring range to be significantly shorter than an overall length of the sensor device and/or of the main body. In particular, the sensor device can have a plurality of separate measuring ranges arranged next to one another in the longitudinal direction of the main body. In particular, the separate measuring ranges have longitudinal extensions in the centimeter range, for example approximately 10 cm, approximately 20 cm, approximately 30 cm, approximately 40 cm or approximately 50 cm. In particular, the measuring ranges of the sensor device arranged in the longitudinal direction of the sensor element could be designed spaced apart from one another, in particular in a non-contacting manner. In particular, the sensor device forms a further measuring range which is preferably designed as a region of the sensor element in which an earth pressure is detected. In particular, the measuring ranges and the further measuring ranges are arranged alternately one behind the other in the longitudinal direction of the sensor device and/or of the main body. In particular, the at least one sensor element, in particular the at least one light-conducting fiber, preferably extends over a plurality of the measuring ranges and/or of the further measuring ranges and particularly preferably over all measuring ranges and/or all further measuring ranges. Preferably, the transmission unit is configured to receive the fluid, in particular the water and/or gas contained, for example, in the ground/a borehole, etc., and to forward/transmit it to the surface of the sensor unit. In particular, the fluid pressure may be a gas pressure and/or a liquid pressure.

Furthermore, it is proposed that the transmission unit comprises at least one receiving element which, when viewed along a central axis of the base body, at least for the most part, in particular completely, encloses the base body and the at least one sensor element in the measuring range. Advantageously, the fluid pressure can be transmitted uniformly from all directions. A particularly high reliability of the measurement can advantageously be achieved. A uniform loading of the sensor unit and of the base body can advantageously be achieved. A good homogeneity of the fluid pressure sensor sensitivity is advantageously achieved at different positions distributed in the longitudinal direction. A particularly high measuring accuracy can particularly advantageously be achieved. In particular, the transmission unit and/or the receiving element enclose the main body at least for the most part in the circumferential direction of the main body. In this context, the phrase "for the most part enclose" is to be understood in particular to mean an enclosure of at least 60%, preferably at least 75% and particularly preferably of at least 90% of an overall circumference of the main body. In particular, the receiving element forms a sleeve around the sensor unit. In particular, a shape of the receiving element corresponds to a shape of the base body, in particular a shape of a hollow profile, for example that of a pipe. In particular, an outer diameter of the sensor unit substantially has the inner diameter of the receiving element. In particular, the base body, the sensor unit and the transmission unit are nested one inside the other, in particular in the form of hollow profiles nested one inside the other.

Furthermore, it is proposed that the transmission unit abuts against the sensor unit, in particular against the casing element of the sensor unit. Advantageously, a fluid pressure can be transmitted at least substantially completely by the transmission unit and a measuring accuracy can thereby be improved. In particular, the transmission unit contacts the sensor unit at least substantially over an entire lateral surface of the sensor unit which is spanned, in particular, by a circumference of the sensor unit and an axial length parallel to the central axis of the base body, in particular of the measuring range. In particular, a contact region between the transmission unit and the sensor unit and/or an overlap region between the transmission unit and the sensor unit defines the measuring range. It is also conceivable for the transmission unit to be arranged around the sensor element in a contactless manner, in particular with a clearance fit between the transmission unit and the sensor unit, in particular the casing element of the sensor unit. In particular, an inner diameter of the transmission unit could be greater than an outer diameter of the sensor unit. In particular, a transmission unit arranged in a contactless manner is arranged loosely around the sensor unit, in particular the casing element of the sensor unit. In this case, the expression "loose" should be understood to mean that a relative movement between the transmission unit and the sensor unit is possible on account of the greater inner diameter of the transmission unit in relation to the outer diameter of the sensor unit.

Furthermore, it is proposed that the base body and the at least one sensor element are connected to one another in a force-fitting and/or form-fitting manner and are jointly at least substantially of elastic form. Advantageously, a fluid pressure can be transmitted to the sensor element. Particularly advantageously, the sensor element can be guided and/or positioned particularly well by the base body. In particular, the force fit is generated and/or provided by a diameter-expanding force which is exerted on the sensor element by the base body. In this case, "connected in a force-fitting and/or form-fitting manner" should be understood to mean, in particular, a releasable connection, wherein a holding force between two components is preferably transmitted by a geometric engagement of the components one inside the other and/or a frictional force between the components, free of a cohesive connection, in particular an adhesive connection. The sensor element preferably has a pronounced stiffness, in particular at least substantially the same stiffness as the base body. The at least substantially identical stiffness of the base body and the sensor element is configured such that the force-fitting and/or form-fitting of the sensor element on the base body is maintained and/or remains substantially uninfluenced in the case of a pressure application/in the case of a change in shape of the base body and/or the sensor element. A "substantially identical stiffness" is to be understood in this context in particular as a maximum deviation of the stiffness of less than 15%, advantageously less than 10%, preferably less than 5% and particularly preferably less than 3%.

Furthermore, it is proposed that the transmission unit comprises at least one receiving element which is formed from a porous material. Advantageously, an improved fluid absorption can take place. Advantageously, an improved transmission of the fluid pressure to the sensor unit can take place. Advantageously, a measuring accuracy is improved. In particular, the porous material has pores and/or capillaries and/or chambers and/or liquid reservoirs and/or similar hollow spaces which are configured to receive and/or hold the fluid. Preferably, the porous material is formed as an absorbent sponge and/or a nonwoven and/or a foam, in particular a polymer foam. Preferably, a porosity or a permeability, in particular for the pore water pressure, of the receiving element lies in a range which is designed to be greater than $10^{-4}$ m/s. It is also conceivable for the receiving element to consist of a hollow space which is formed by a fluid-permeable and/or partially permeable membrane. In particular, the pore material is in the form of a stable material.

In addition, it is proposed that the transmission unit comprises at least the receiving element and a support unit, wherein the support unit is configured to shield the at least one receiving element at least in sections against a deformation caused by a mechanical action of force from the outside. Advantageously, a damage to the sensor unit is prevented. Advantageously, a fluid pressure can be measured. Advantageously, a measuring accuracy, in particular in the case of ground measurements, can be improved. Advantageously, a measurement of the fluid pressure separately from a ground pressure and/or earth pressure likewise prevailing in the soil can be made possible, in particular since the support unit is of water-permeable but impermeable design to soil, in particular earth and/or rock. Advantageously, a service life of the sensor device can be improved. In particular, the support unit supports and/or shields a substance which is different from a fluid, in particular a solid, in particular earth and/or rock and/or further solids enriched in the soil. In particular as a result of the fluid-permeable and solids-impermeable properties of the support unit, only one fluid comes into contact with the receiving element and/or with the sensor unit. In particular, the support unit is configured to separate the fluid pressure from a mechanical pressure, in particular pressure generated by gravity, in particular weight pressure of solids from the fluid pressure. Preferably, the support unit has passages, in particular recesses, bores or the like, which are of exclusively fluid-permeable design. In particular, the support unit is of soil-pressure-resistant design. It is conceivable for the receiving element also to already have a soil-pressure resistance at least for relatively low depths. In particular, a ground pressure-resistant object is at least substantially incompressible and/or indeformable by ground pressures, as occur at typical drilling depths, e.g., up to 20 m, up to 50 m, up to 500 m, or up to 5000 m, or typical building depths.

Furthermore, it is proposed that the support unit, when viewed along a central axis of the base body, at least for the most part, in particular completely, encloses the at least one receiving element over at least a majority of the measuring range. Advantageously, the entire measuring range, in particular the entire sensor unit, is protected. Advantageously, an improved measuring accuracy can be provided over the entire measuring range. In particular, the support unit at least substantially completely contacts a surface of the receiving element along the central axis of the base body. In particular, the support unit is configured to provide the fluid to the receiving element at least substantially over the entire measuring range, wherein the mechanical pressure, in particular ground pressure, is shielded at least substantially over the entire measuring range. In this context, "a majority of the measuring range" should be understood to mean in particular at least 60%, preferably at least 75% and particularly preferably at least 90% of the measuring range. In this context, the expression "enclose for the most part" should be understood to mean in particular an enclosure of at least 60%, preferably at least 75% and particularly preferably of at least 90% of an entire circumference of the receiving element. It is conceivable for the receiving element to be slightly pretensioned and/or compressed by the support unit. It is also conceivable for the support unit to be arranged on the measuring range, but not to be contacted over the entire circumference with the receiving element, in particular to be realized in a partially contactless and/or contactless manner with respect to the receiving element. In this case, the receiving element could be inserted loosely into the support unit.

In addition, it is proposed that the support unit is configured to conduct the fluid from the outside through the support unit to the receiving element. Advantageously, the fluid pressure can be separated from a solid pressure. In particular, the support unit is provided with, in particular at least substantially and/or predominantly radially arranged, recesses which are permeable only to fluids. It is conceivable for the recesses to be of different sizes. In particular, the recesses are designed as bores. It is also conceivable for the recesses in the support unit to be designed as a type of membrane which is partially permeable to fluids, and are configured to measure a partial fluid pressure. Preferably, the support unit is configured to provide the fluid, in particular the liquid and/or the water, of the receiving unit in a uniformly distributed manner, in particular at uniform and/or regularly distributed intervals, wherein the support unit thereby enables the measurement of different fluid pressures over the measuring length. In particular, the support unit is formed free of burrs, with the result that the receiving element is not damaged as a result of relative movements and/or vibrations and/or changing fluid pressure. The support unit is fastened to the receiving element in a form-fitting and/or force-fitting manner, in particular pushed over the receiving element, and/or slipped, for example with a press fit, a transition fit or a clearance fit. For example, the support unit and the receiving element could be mounted loosely on one another.

Furthermore, it is proposed that the support unit comprises at least one support element which is formed from a solid material. Advantageously, greater forces can be shielded. In particular, the solid, in particular stable, material is a metallic material, in particular steel, and/or a plastic, in particular polymer, and/or a composite material, in particular a composite material composed of at least one plastic and a reinforcing material, such as glass and/or carbon fibre, which is in particular of at least soil-pressure-resistant design. In particular, the material used is corrosion-resistant. The support unit is preferably of rigid, in particular flexurally rigid, design. It is conceivable for reinforcing elements which are aligned in particular parallel to the central axis of the base body and/or in circumferential direction to be arranged on the support element. It is conceivable for the support unit to have a plurality of support elements which are arranged next to one another and/or at least partially nested one inside the other in the longitudinal direction. In particular, each measuring range of the sensor device is assigned a separate support element. Alternatively, it is conceivable for the entire support unit to be formed by a single support element. In particular, the support element forms a type of collar which engages around the transmission unit, in particular in the circumferential direction.

Furthermore, it is proposed that the transmission unit forms a protected hollow space around the sensor unit, into which water can penetrate free of surrounding material, such as in particular soil. The hollow space serves in particular for providing a separated region in which a fluid pressure prevails independently of further pressure influences, such as in particular an earth pressure. The same fluid pressure as in an environment of the transmission unit preferably prevails in the hollow space. The hollow space preferably extends in particular coaxially around the sensor unit. It is in particular conceivable for the hollow space to be already filled with a fluid, in particular water, when the sensor device is installed. As a result, external influences during a measurement of the fluid pressure can in particular be avoided in a targeted manner.

Furthermore, it is proposed that the transmission unit has at least one receiving element which is formed by a filter, wherein fluid, in particular water, can penetrate into the hollow space separately from a surrounding material via the at least one receiving element. In this case, the receiving element can extend both over a large area over an outer surface of the transmission unit and can also be arranged only to a limited extension in the region of a through-channel. The transmission unit preferably has at least one through-channel which connects an environment of the transmission unit to the hollow space in which the at least one receiving element is arranged. A fluid which passes through the through-channel preferably also has to pass through the receiving element. The receiving element is in particular water-permeable. As a result, in particular a separate penetration of water into the hollow space can be made possible. In particular, a penetration of surrounding material can be avoided.

Furthermore, it is proposed that the sensor unit forms a location-distributed strain sensor. In particular, the sensor unit can be configured to determine in each case a pressure acting on different sections of the sensor element. For this purpose, for example, a deformation of the at least one sensor element is related to a first section, on which the transmission unit is arranged, and to a further section arranged along the base body, which is arranged spaced apart from the transmission unit. Advantageously, different pressures and/or a pressure profile in the longitudinal extension of the sensor device can be measured by the location-distributed strain sensor. In particular, with the location-distributed strain sensor, a location-distributed, in particular continuous, preferably fast-reaction, measurement can be carried out with a spatial resolution of 0.001 meter to 10 meters, which enables a, preferably fast-reaction, measurement of different fluid pressures and/or a fluid pressure profile along the optical fiber. The expression "location-distributed" should preferably be understood to mean that a fluid pressure and/or a pressure profile different from one another can be measured and/or determined at different locations and/or positions. In particular, a DFOS (distributed fiber optic sensor), in particular a DSS (distributed strain sensor), is used for the fluid pressure measurement. In particular, the sensor unit forms the DFOS and/or the DSS. In particular, the location-distributed strain sensor (DSS) is configured to provide optical scattering, reflection and/or transmission changes in the fiber optic sensor element induced at different local positions by pressure, in particular fluid pressure, which can be measured and/or determined. In particular, a measuring range of the fluid pressure extends from 0.1 kPa to 50 MPa, in particular with a resolution and/or accuracy of 0.1 kPa. In particular, for a calibration, measurements are carried out at two positions different from one another, wherein different pressures, in particular fluid pressures, are applied successively only at the one position. In particular, the difference in the measurement signal between the unloaded position, in particular loaded with ambient pressure, and the pressure-loaded position, in particular loaded successively with different fluid pressures, can be determined, wherein the difference in the measurement signal is assigned to the differential pressure between the unloaded position and the pressure-loaded position. In particular, the applied pressure, in particular fluid pressure, can be inferred via the relationship between the measurement signal and the differential pressure in the normal operation of the sensor unit.

Furthermore, it is proposed that the sensor device has a compensation element which is designed as a light-conducting fiber and is arranged in or on the main body and preferably extends at least substantially parallel to a longitudinal extension of the main body or runs helically. Advantageously, a measuring accuracy can be improved. In particular, the compensation element is configured to compensate temperature fluctuations to a calibration temperature and/or temperature fluctuations over the length of the measuring range. In particular, a measurement signal caused by a temperature-induced change in length of the compensation element is corrected computationally with the measurement signal of the sensor element, wherein a temperature influence on the measurement is eliminated. In particular, the measuring range of the compensation element, in particular for temperature compensation of the measurement, lies in a range of −50° C. to +300° C. with an accuracy and/or resolution of 0.1° C. The measurement length of the compensation element, in particular for temperature compensation, corresponds to the measurement length of the sensor element. In particular, the overall length of the compensation element at least substantially corresponds to the overall length of the sensor device. In particular, a length of the compensation element can be up to approximately 30 km or up to approximately 50 km. In particular, a spatial resolution of a compensation signal generated by the compensation element is at least 10 m, preferably at least 0.5 m, preferably at least 0.1 m and particularly preferably at least 0.001 m. Here, "substantially parallel" should be understood to mean, in particular, an alignment of a direction relative to a reference direction, in particular in a plane, wherein the direction with respect to the reference direction has a deviation of, in particular, less than 8°, advantageously less than 5° and particularly advantageously less than 2°.

In particular, the compensation element is designed as a DTS temperature sensor based on the principle of distributed temperature sensing (DTS). In particular, the DTS temperature measurement principle uses Raman, Brillouin or Rayleigh scattering in a light-conducting fiber for temperature measurement. In particular, for this purpose, an optical laser signal which is transmitted through the light-conducting fiber is backscattered from the material of the light-conducting fiber by optical scattering to the transmitting end of the light-conducting fiber, where the scattered signal is then analyzed and then a measure of a temperature distribution along the fiber can be determined. In particular, the temperature-induced expansion determined by the DTS temperature sensor is offset with the fluid-pressure-induced expansion/compression measured by the sensor unit to form a temperature compensation. The compensation cable is preferably arranged at least substantially centrally in the interior of the base body, in particular of the pipe. It is also conceivable for the compensation cable to be arranged eccentrically in the interior of the base body, in particular of the pipe. It is also conceivable for the compensation element to be arranged on an inner wall of the base body, in particular of the pipe. The compensation element is preferably connected fixedly, in particular cohesively, to the base body. However, it is also conceivable for the compensation element to be arranged loosely, in particular unfastened and/or movably, in an interior of the base body. It is conceivable for further measurement variables, in particular pressure, to be corrected by the compensation element.

Furthermore, it is proposed that the transmission unit comprises a plurality of receiving elements which are arranged distributed along a longitudinal extension of the base body. Longer distances at which no measurement is intended to be carried out can advantageously be bridged and costs can thus be saved. Advantageously, different pressures, in particular fluid pressures, can be measured. Fluid pressure measurements with different pressure which do not influence one another are advantageously carried out simultaneously at the different receiving elements. Each of the receiving elements arranged on the sensor unit preferably has an identical length of between 20 mm and 500 mm. It is also conceivable for the receiving elements to have lengths different from one another of between 20 mm and 500 mm. The receiving elements are preferably arranged without contact with one another. A spacing between two receiving elements is preferably provided. The spacings between the receiving elements are preferably of identical size. It is conceivable for the spacings between the receiving elements to be designed differently from one another. It is conceivable for the spacings between the receiving elements to be of regular and/or irregular design. It is conceivable for the lengths of the receiving elements to be of regular and/or irregular design. It is conceivable for the position of the receiving units to be of variable, in particular variable and/or adjustable design. It is conceivable for the spacings between the receiving elements, in particular the regions without a support unit and/or without a receiving element, to be configured to measure the ground pressure, in particular earth pressure, and/or solid pressure, in the earth. In particular, the total pressure in the ground is measured at the spacings between the receiving elements and offset with a measurement result of the fluid pressure measurement at the receiving elements.

Furthermore, it is proposed that the sensor unit comprises at least one further sensor element which is in the form of a light-conducting fibre, extends at least substantially helically around the base body at least in the measuring range along the longitudinal extension of the base body and preferably has at least one fibre parameter which is different from the sensor element. Advantageously, a measuring accuracy and/or a measuring resolution can be improved. Advantageously, a reliability, in particular by a second, redundant sensor element, can be improved. At least one further sensor element is preferably arranged, in particular helically, but phase-shifted with respect to the first sensor element, on the circumference of the main body with the same lay length and with the same winding direction. It is conceivable that at least one fibre parameter, in particular a lay length and/or a fibre diameter and/or a winding direction, is changed with respect to the fibre parameter of the first sensor element. A "fiber parameter" is intended to mean, in particular, a fiber diameter and/or a fiber length and/or a winding diameter and/or a winding direction and/or a lay length and/or a fiber material (e.g. glass, plastic optical fiber, photonic crystal fiber) and/or a refractive index and/or a profile and/or a fiber type (single mode, multimode, step index, graded index, polarization maintaining fiber, high birefringent fiber) and/or a numerical aperture and/or a core diameter of the fiber and/or a cladding diameter and/or a coating material of the fiber and/or a dimension (micro- and macro-benign optimization) and/or a further property or embodiment of the wound light-conducting fiber. It is conceivable for the sensor unit to comprise, in addition to the first and the second light-conducting fiber, further light-conducting fibers, in particular with fiber parameters different from the first and/or the second light-conducting fiber. For example, two light-conducting fibers could be arranged as a lang lay and/or as a cross lay. It is also conceivable for fibre parameters of a light-conducting fiber to change in the longitudinal direction of the sensor device. It is conceivable for the arrangement of the light-conducting fiber to be arranged in a helical manner only in sections. In addition, it is conceivable for a plurality of light-conducting fibers to be braided to form a fiber bundle.

Furthermore, a sensor system for measuring a fluid pressure, having at least one sensor device, in particular the afore-described sensor device, and having an evaluation unit for determining the fluid pressure as a function of a deformation of a sensor element of the sensor device, wherein the evaluation unit is configured to determine the fluid pressure by means of the sensor element via a distributed glass fibre scanning, is proposed. The fluid pressure can thereby advantageously be determined in the environment, in particular in a soil, independently of a mechanical pressure of a substance which is different from a fluid, in particular of a solid, for example of a rock or an earth of the soil. A particularly high measuring accuracy can particularly advantageously be achieved. The evaluation unit preferably has at least one computer, having at least one processor and having at least one memory. In particular, the evaluation unit comprises an interface which is configured to receive the measurement signal from the sensor device. In particular, the evaluation unit has a light source which is configured to provide a pulsed or continuous light, in particular with a constant wavelength or with different wavelengths, for the measurement with the sensor unit. In particular, the evaluation unit has a photodetector which is configured to detect the light scattered or transmitted or reflected in the sensor unit. In particular, the light detected by the detector is analyzed and/or evaluated by means of the evaluation unit. The evaluation unit has in particular an output unit. In particular, the output unit is configured to output the evaluations of the evaluation unit to a user. In particular, a "distributed glass fibre scanning" should be understood to mean a pressure measurement by means of a DFOS (distributed fiber optic sensor). In particular, in the case of the distributed glass fibre scanning, a plurality of pressure measurements can be carried out in the longitudinal direction of the sensor element, in particular independently of one another.

Furthermore, a use of the sensor device and/or of the sensor system for measuring fluid pressure changes and/or changes in the earth pressure, in particular in a soil, is proposed. Advantageously, the sensor device can be used for fluid pressure monitoring on construction sites, in particular of the fluid pressure due to an increase in the ground water level, for example due to the rise in the level of rivers. In particular, the sensor device is used for measuring the change in the water pressure in the soil as a result of erosion, in particular earth pressure. In particular, the sensor device is used for a fluid pressure measurement in earth bores which is generated in particular by pore water, support fluid and/or gas pressure. In particular, the sensor device is used for measuring the change in the soil pressure in the soil as a result of filtration, in particular pore water pressure, and/or as a result of landing of sediments and loads, in particular earth pressure. In particular, the sensor device is used for measuring ground water heights, in particular pore water pressure. Preferably, the fluid pressure can be measured in fluid-permeated, in particular water-permeated, earth and rock layers free of the earth and/or rock pressure.

Furthermore, a method for manufacturing a sensor device is proposed, wherein preferably at least the base body is produced in an extrusion method, in particular a coextrusion method, and wherein during the extrusion of the base body the, in particular prefabricated, compensation element is also introduced. Advantageously, the sensor device can be produced cost-effectively. The base body, in particular the pipe and/or the foam filling, is preferably produced simultaneously in a coextrusion process, wherein in the method step the compensation element can be carried along at an extrusion speed and thereby introduced into the base body core. It is conceivable for a material-specific adhesion promoter to be introduced in each case between the contact surfaces, in particular between the compensation element and the foam, or between the foam and the hollow profile. In particular, the adhesion promoter is configured to connect the surfaces to one another. In a subsequent step or simultaneously with the extrusion of the main body, the sensor element could be applied helically to the main body. In a further subsequent step or simultaneously with the extrusion of the main body, the casing element, the transmission unit and/or the support unit could also be applied. It is conceivable for the entire sensor device to be manufactured in a single coextrusion process or in an uninterrupted production line with chained coextrusion processes. Alternatively, manufacture by means of a pultrusion process or by means of manual wrapping and gluing is also conceivable.

The sensor device according to the invention is not intended to be limited here to the application and embodiment described above. In particular, the sensor device according to the invention can have a number of individual elements, components and units as well as method steps differing from a number mentioned herein in order to fulfill a functionality described herein. In addition, in the case of the value ranges specified in this disclosure, values lying within the stated limits are also intended to be considered as being disclosed and usable as desired.

DRAWINGS

Further advantages result from the following description of the drawings. Exemplary embodiments of the invention are illustrated in the drawings. The drawings, the description and the claims contain numerous features in combination. The person skilled in the art will expediently also consider the features individually and combine them to form meaningful further combinations.

Figure 2:
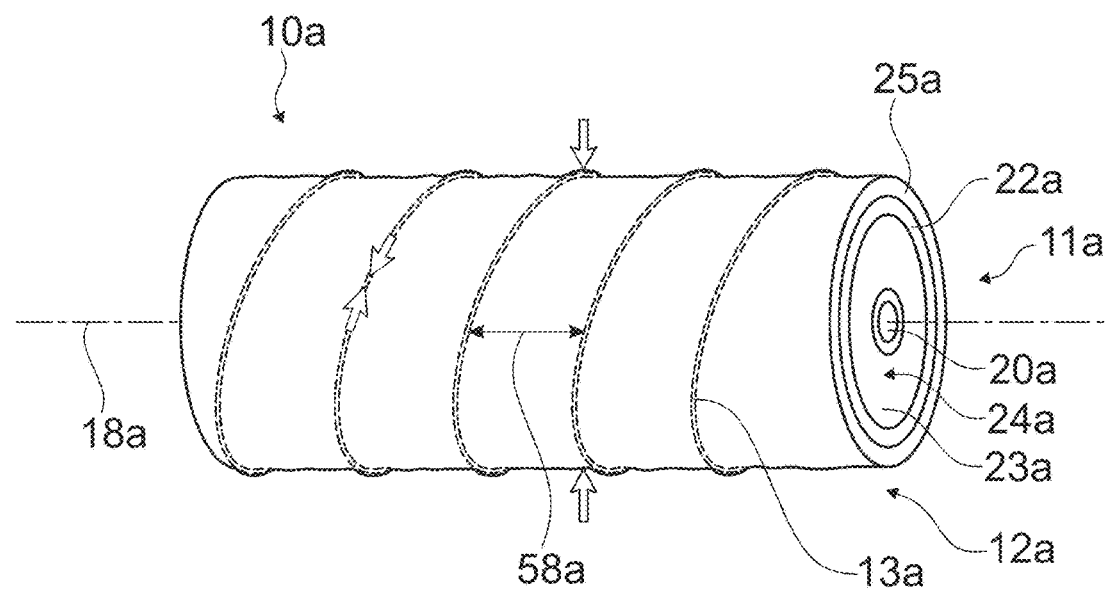
Figure 3:
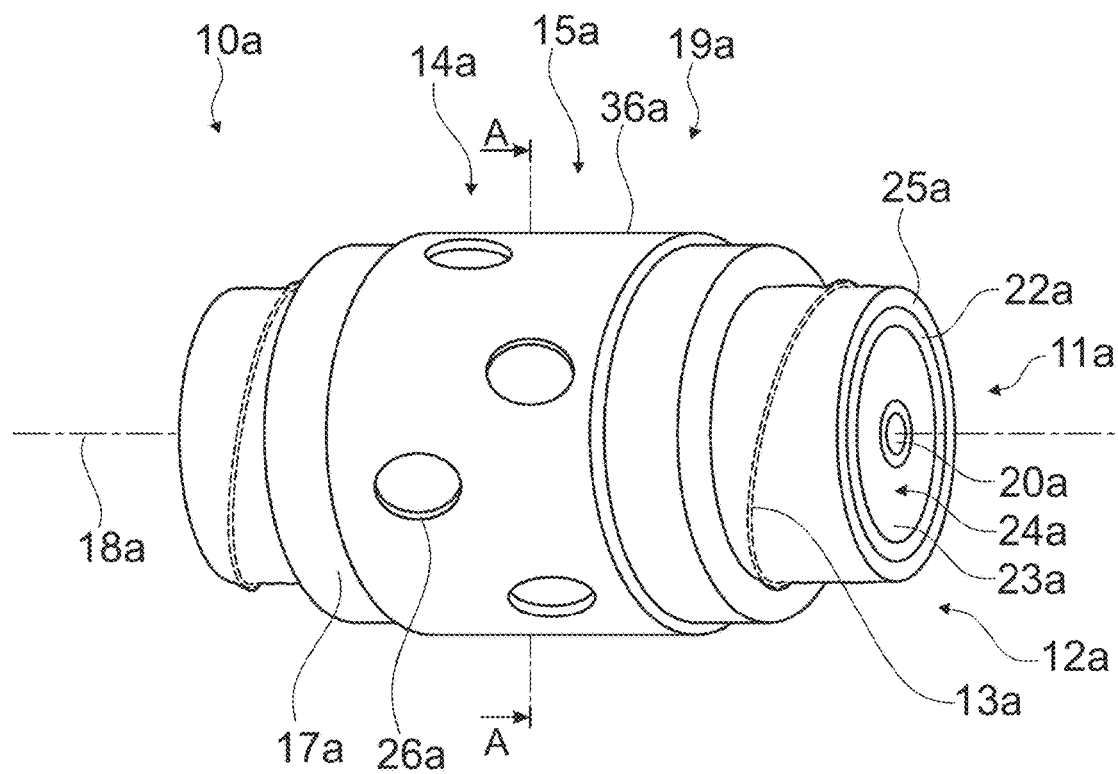
Figure 4A:
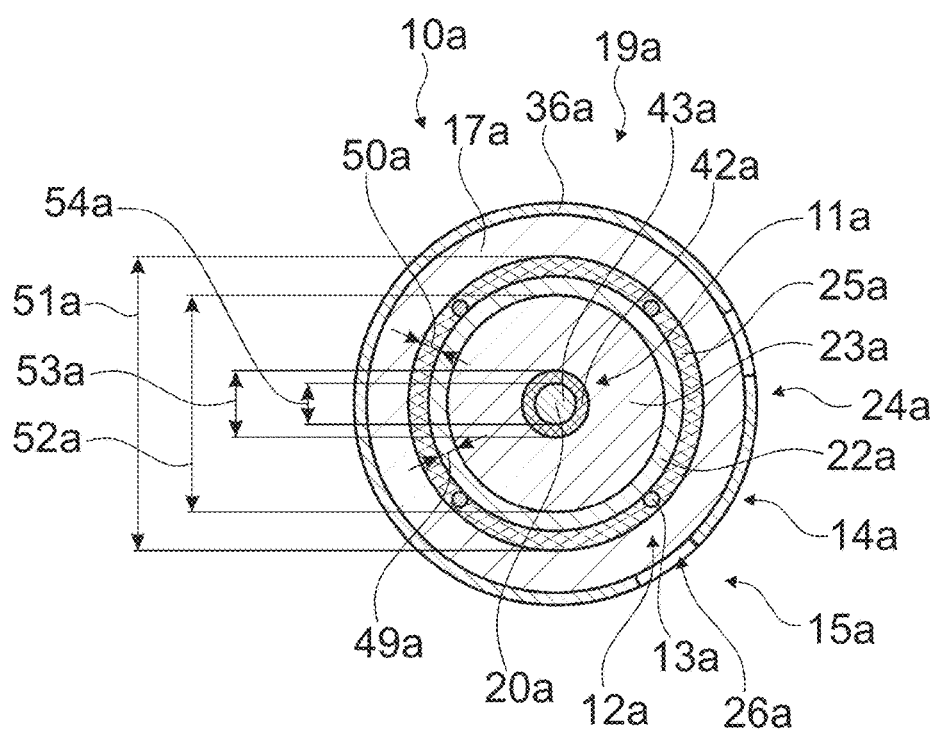
Figure 4B:
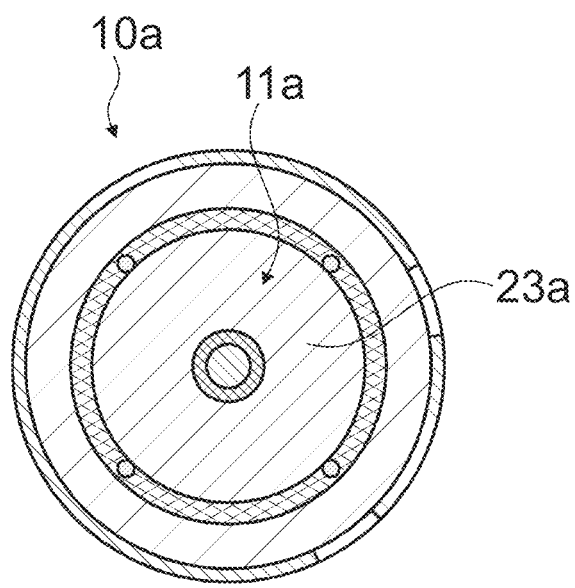
Figure 5:
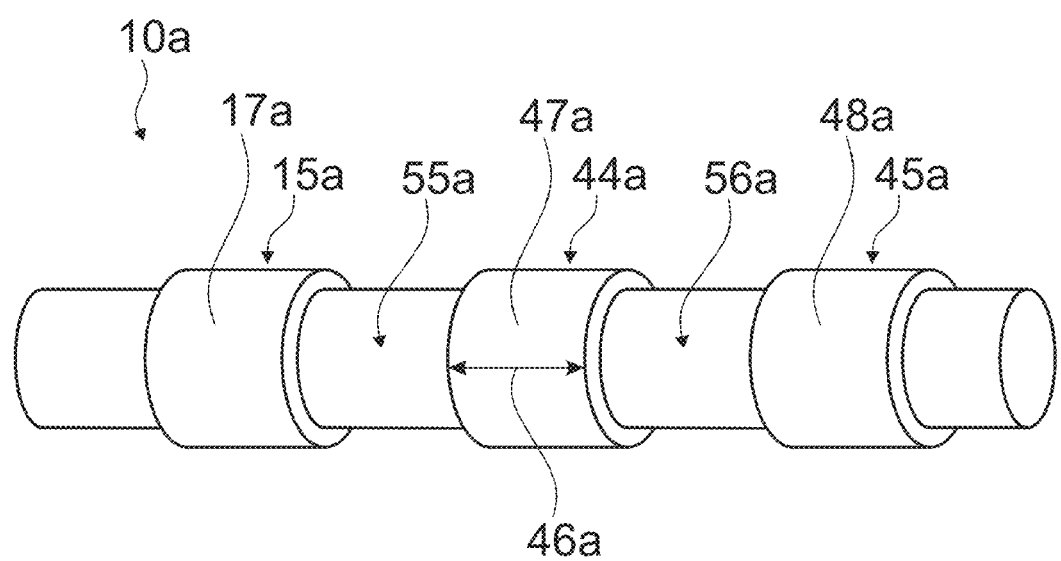
Figure 6:
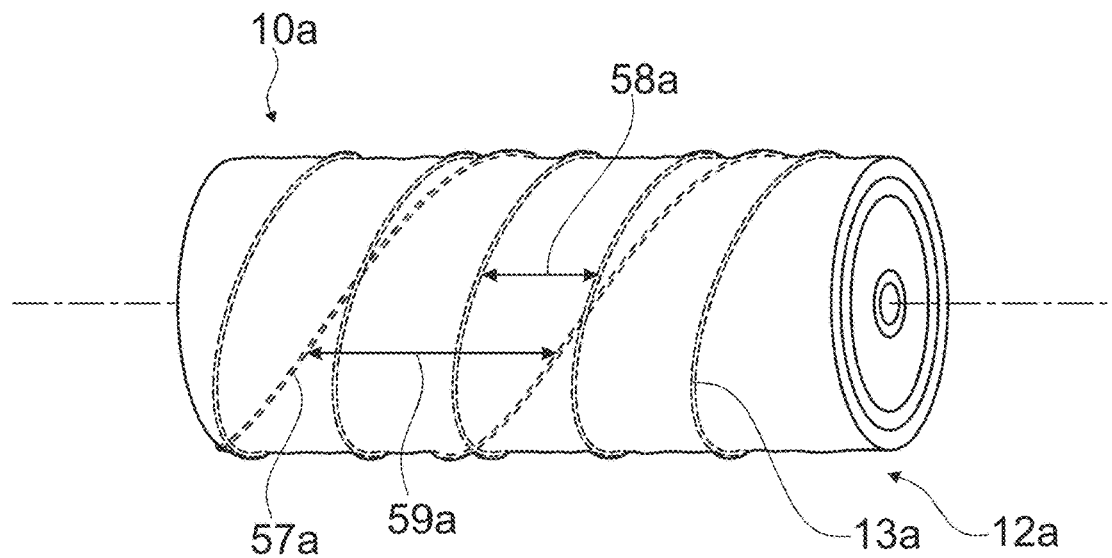
Figure 7:
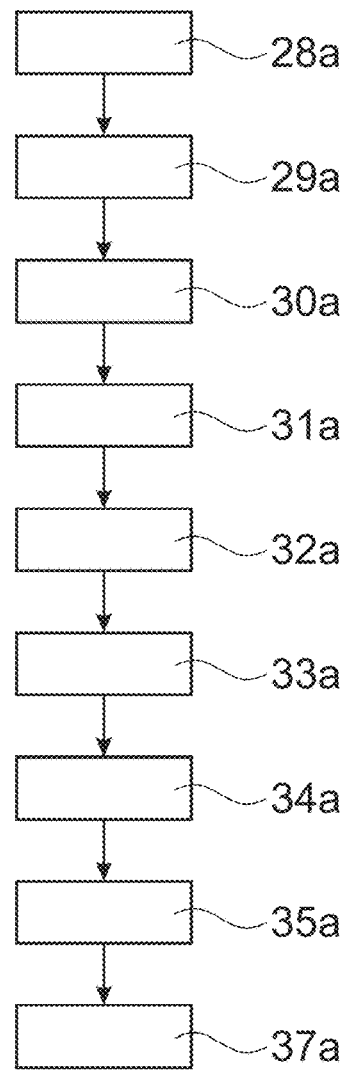
Figure 8:
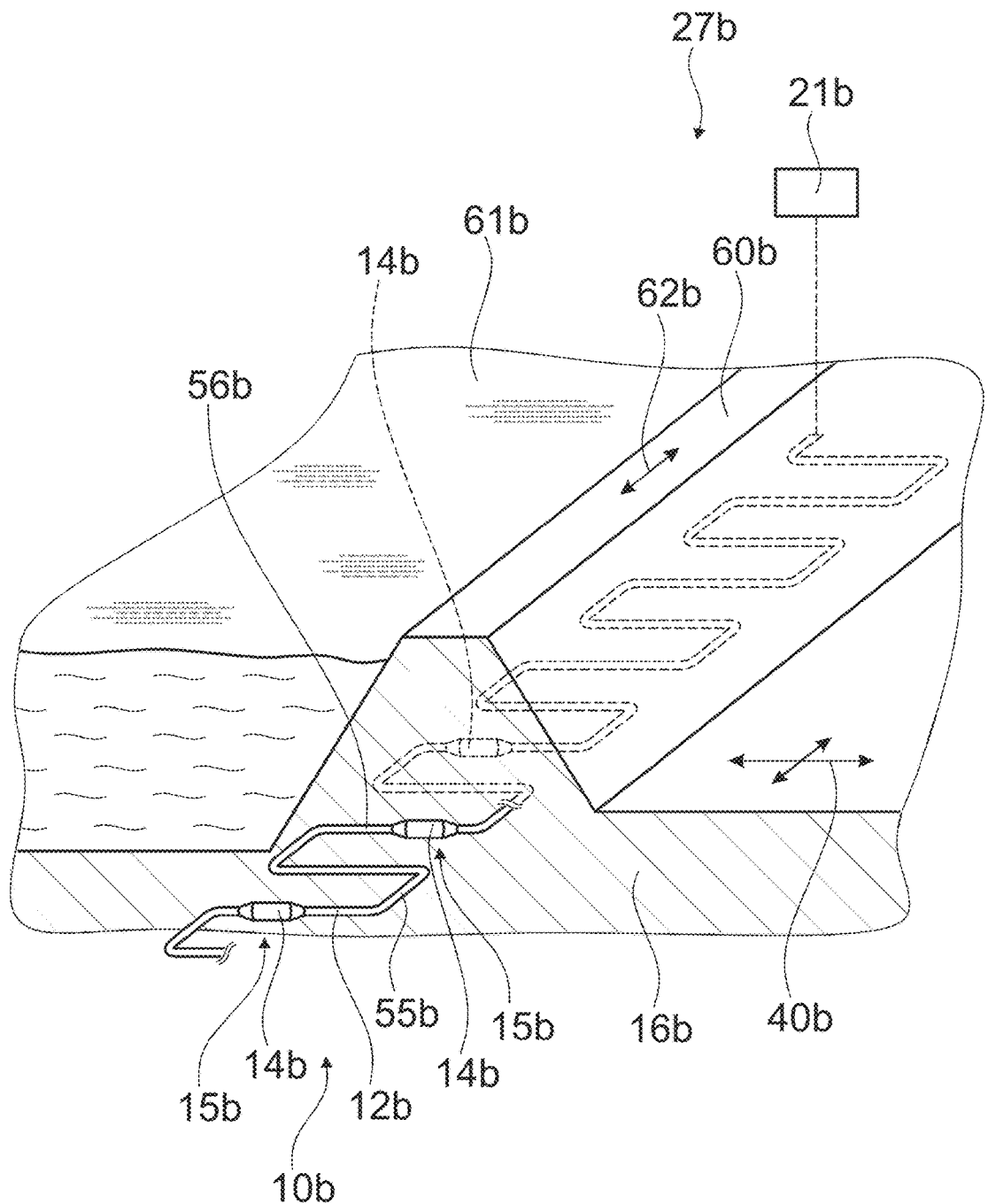
Figure 9:
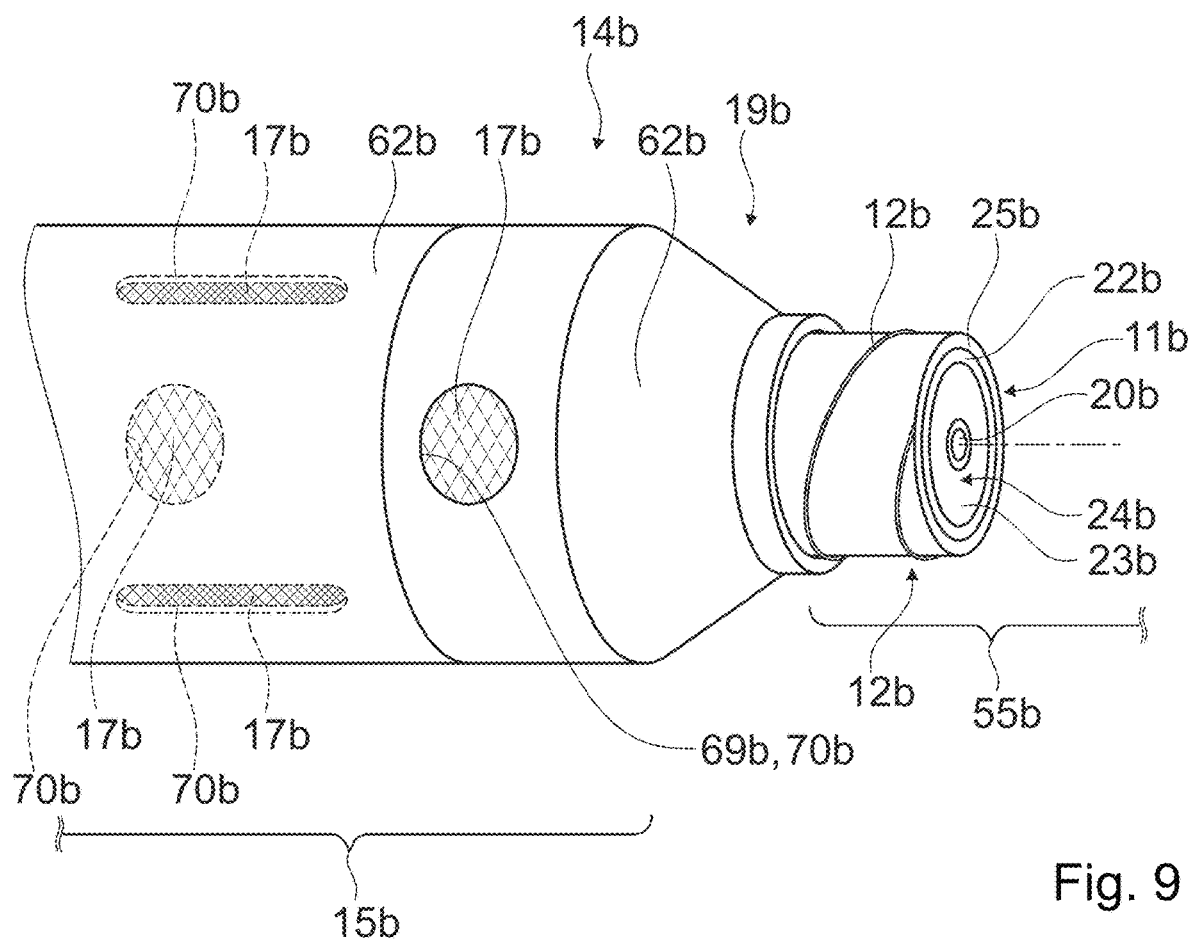
Figure 10:
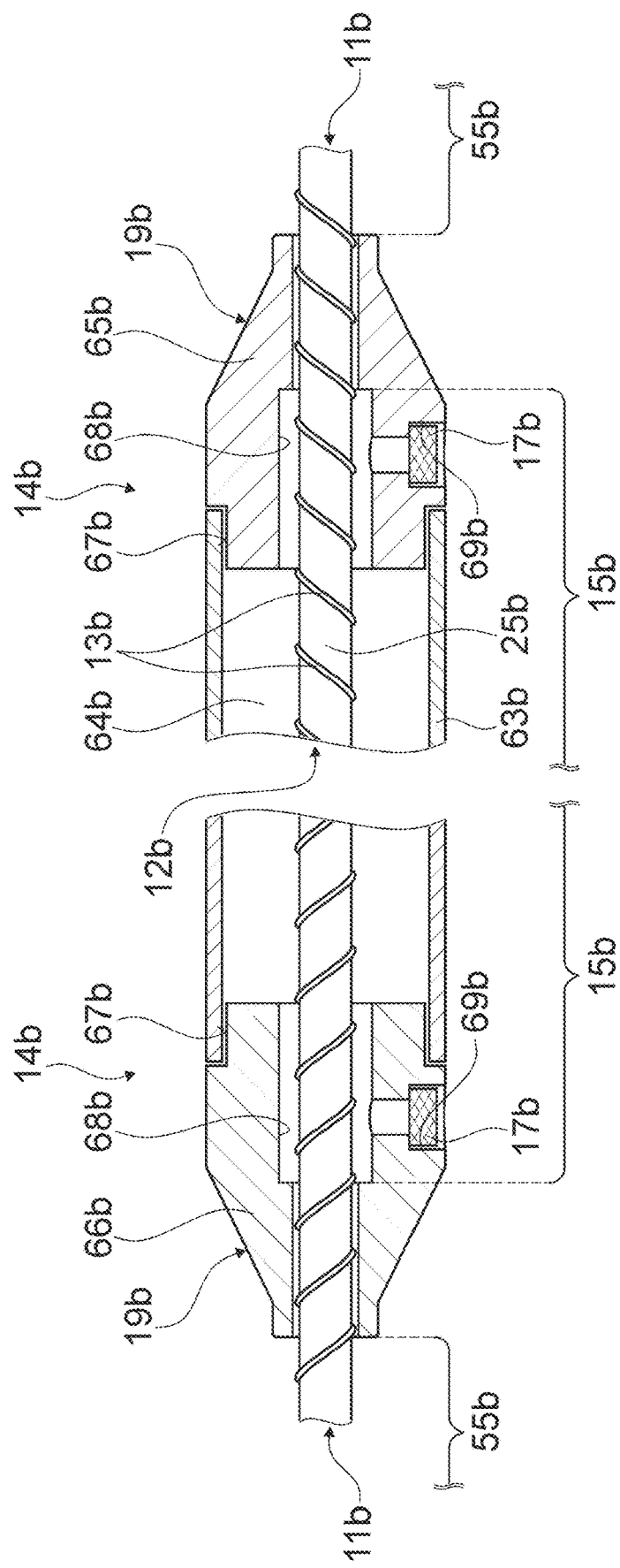

It is shown in:

FIG. 1 a schematic illustration of a sensor system with sensor devices,

FIG. 2 a schematic perspective illustration of a part of a base body and a sensor unit of one of the sensor devices, FIG. 3 a schematic perspective illustration of the part of the sensor device with a transmission unit, FIG. 4a a schematic sectional illustration of the sensor device, FIG. 4b a schematic sectional illustration of an alternative sensor device, FIG. 5 a schematic illustration of the sensor device with a segmental arrangement of transmission units, FIG. 6 a schematic perspective illustration of the sensor device with a sensor unit which has an additional sensor element, FIG. 7 a schematic flow diagram of a method for manufacturing the sensor device, FIG. 8 a schematic illustration of a river, a river dam and an alternative sensor system with an alternative sensor device, FIG. 9 a partial detail of the sensor device with a transmission unit in a schematic illustration and FIG. 10 the partial detail of the sensor device with the transmission unit in a schematic sectional illustration.

DESCRIPTION OF THE EXEMPLARY EMBODIMENTS

FIG. 1 shows schematically a sensor system 27*a*. The sensor system 27*a* has a sensor device 10*a*. In the case illustrated in FIG. 1, the sensor system has two sensor devices 10*a* by way of example. The sensor device 10*a* forms a spatially resolved pressure sensor. The sensor device 10*a* is configured to measure a fluid pressure in a soil 16*a*. The sensor device 10*a* is configured to measure fluid pressure changes in the ground. The sensor device 10*a* is configured to be used for measuring earth pressure changes. The sensor device 10*a* can be laid vertically in the soil 16*a*. One of the sensor devices 10*a* illustrated in FIG. 1 is introduced/countersunk into a borehole 38*a* by way of example in vertical direction 39*a*. The sensor device 10*a* can be laid in the soil 16*a* in horizontal direction 40*a*. A further sensor device 10*a* illustrated in FIG. 1 is buried under a surface of the soil by way of example in horizontal direction 40*a*. The sensor device 10*a* can be laid vertically and horizontally in the soil 16*a*. The sensor device 10*a* can be laid in curves or arcs, as is shown by way of example by the meandering shape in FIG. 1. The sensor device 10*a* is of flexurally slack design. The sensor system 27*a* has an evaluation unit 21*a*. The evaluation unit 21*a* is configured to receive and to evaluate the measurement signal from the sensor device 10*a*. The evaluation unit 21*a* is configured to determine the fluid pressure in the soil 16*a* via a distributed glass fibre scanning.

FIG. 2 shows schematically a part of the sensor device 10*a*. The sensor device 10*a* is configured to measure the fluid pressure. The sensor device 10*a* has a main body 11*a*. The main body 11*a* comprises a hollow body 22*a*. The hollow body 22*a* is tubular in shape. The hollow body 22*a* is formed from an elastic material. The material for the hollow body 22*a* has a low stiffness with a modulus of elasticity of less than 10 megapascals. The material for the hollow body 22*a* has elastic material properties in a temperature range from −5° C. to 30° C. The material for the hollow body 22*a* has a low viscosity and therefore does not tend to creep. The hollow body 22*a* is designed to be deformable. The hollow body 22*a* is designed to be dimensionally stable. The hollow body 22*a* is formed from a plastic.

The hollow body 22*a* forms an interior 24*a*. The main body 11*a* comprises a filling element 23*a*. The filling element 23*a* is arranged in the interior 24*a* of the hollow body 22*a*. The filling element 23*a* is formed from a foam. Alternative configurations of the filling element 23*a*, such as, for example, a gel, are conceivable. In an alternative embodiment, the main body 11*a* can be designed to be hollow (i.e. without the filling element 23*a*) in the interior 24*a*.

The sensor device 10*a* has a sensor unit 12*a*. The sensor unit 12*a* forms a location-distributed strain sensor. The evaluation unit 21*a* is configured to determine the fluid pressure as a function of a deformation of a sensor element 13*a* of the sensor device 10*a*. The sensor unit 12*a* is in the form of a fibre-optic sensor unit 12*a*. The base body 11*a* is configured to receive the sensor unit 12*a*. The sensor unit 12*a* is arranged on an outer circumference of the base body 11*a*. The sensor unit 12*a* has a sensor element 13*a*. The sensor element 13*a* is in the form of a light-conducting fiber. The light-conducting fiber is arranged in a helical manner on the outer circumference of the base body 11*a*. The light-conducting fiber extends along a longitudinal direction of the base body 11*a* in a helical manner around the base body 11*a*. A plurality of sensor elements 13*a*, 57*a* arranged in a helical manner could be arranged on the outer circumference of the base body 11*a* (cf. FIG. 6).

The sensor element 13*a* is configured to provide a measurement signal for measuring the fluid pressure. The sensor element 13*a* generates a measurement signal when a fluid pressure is applied and the sensor element 13*a* is compressed or expanded by the fluid pressure (cf. the arrows indicated in FIG. 2). The sensor element 13*a* is connected to the base body 11*a* in a force-fitting manner. Alternatively or additionally, the sensor element 13*a* can be connected to the base body 11*a* in a form-fitting manner. The sensor element 13*a* is of elastically deformable design. The base body 11*a* and the sensor element 13*a* are jointly of elastic form. The sensor element 13*a* has substantially the same stiffness as the base body 11*a*. The substantially identical stiffness is configured such that the force-fitting and/or form-fitting between sensor element 13*a* and base body 11*a* is maintained even in the case of an expansion or compression of the base body 11*a* and of the sensor element 13*a* as a result of a fluid pressure application. The sensor unit 12*a* has a casing element 25*a*. The casing element 25*a* is formed from a thermoplastic elastomer. The casing element 25*a* is of elastically deformable design. The casing element 25*a* and the sensor element 13*a* are jointly of elastic form. The casing element 25*a* is of grip-like design on the surface. The casing element 25*a* encases the base body 11*a*. The casing element 25*a* encases the sensor element 13*a*. The casing element 25*a* is configured to protect the sensor element 13*a* against dirt and/or damage and/or corrosion etc. The casing element 25*a* is configured to transmit the fluid pressure to the sensor element 13*a*. The casing element 25*a* is of water-impermeable design.

The sensor device 10*a* has a compensation element 20*a*. The compensation element 20*a* is in the form of a light-conducting fiber. The compensation element 20*a* is in the form of a DTS temperature sensor. In an alternative embodiment, the compensation element 20*a* could be in the form of a DSS strain sensor. The compensation element 20*a* has a glass fiber 42*a*. The compensation element 20*a* has a plastic sheath 43*a*. The compensation element 20*a* is arranged in the interior 24*a* of the hollow body 22*a*. The compensation element 20*a* is arranged along a central axis 18*a* in the interior 24*a* of the hollow body 22*a*, cf. FIGS. 2-4. In an alternative embodiment, the compensation element 20*a* could also be arranged eccentrically, for example on an inner circumference or on an outer circumference of the base body 11*a*. The compensation element 20*a* is configured to provide a measurement signal for a temperature-induced change in length.

FIG. 3 shows schematically the part of the sensor device 10*a* already illustrated in FIG. 2 with an additional transmission unit 14*a*. The sensor device 10*a* has the transmission unit 14*a*. The transmission unit 14*a* is configured to receive a fluid from an environment of the sensor device 10*a*, for example a soil in which the sensor device 10*a* is buried. The transmission unit 14*a* is configured to transmit a fluid pressure from the environment to the sensor unit 12*a*. The transmission unit 14*a* is configured to transmit the fluid pressure to the sensor unit 12*a* for a deformation of the sensor element 13a. The transmission unit 14a is arranged around the base body 11a. The transmission unit 14a is arranged around the sensor element 13a. The transmission unit 14a is arranged around the casing element 25a. The transmission unit 14a abuts against the sensor unit 12a. The transmission unit 14a abuts against the outer circumference of the sensor unit 12a. The transmission unit 14a is arranged on the outside of the casing element 25a. The transmission unit 14a contacts the sensor unit 12a. The transmission unit 14a forms a measuring range 15a. The measuring range 15a forms a region in which the fluid pressure (protected from the earth pressure) can be measured. The transmission unit 14a can form a plurality of separate measuring ranges 15a, 44a, 45a (cf. FIG. 5). The transmission unit 14a is arranged in the measuring range 15a. The transmission unit 14a defines the extent of the measuring range 15a. Outside the transmission unit 14a/the measuring range 15a, the fluid pressure cannot be measured uninfluenced by the earth pressure.

The transmission unit 14a has a receiving element 17a. The receiving element 17a, when viewed along a central axis 18a of the base body 11a, completely encloses the base body 11a in the measuring range 15a. The receiving element 17a, when viewed along the central axis 18a of the base body 11a, completely encloses the sensor unit 12a in the measuring range 15a. The receiving element 17a, when viewed along the central axis 18a of the base body 11a, completely encloses the sensor element 13a in the measuring range 15a. The receiving element 17a, when viewed along the central axis 18a of the base body 11a, completely encloses the casing element 25a in the measuring range 15a. The receiving element 17a contacts the casing element 25a in the measuring range 15a. The receiving element 17a is formed from a porous material. The receiving element 17a has a porous permeability of more than 104 m/s. The receiving element 17a is configured to receive a fluid. The receiving element 17a is configured to pass on and/or to transmit the fluid pressure to the sensor unit 12a, in particular the casing element 25a. The receiving element 17a has a length 46a of 10 cm to 1 meter. In an alternative embodiment, a continuous receiving element 17a is also conceivable, which extends over the entire length of the sensor device 10a. The transmission unit 14a comprises a plurality of receiving elements 17a, 47a, 48a. The receiving elements 17a, 47a, 48a are arranged distributed along a longitudinal extension of the base body 11a (cf. FIG. 5). As a result, a plurality of adjacent measuring ranges 15a, 44a, 45a are formed by the sensor device 10a. The spacings between the receiving elements 17a could also be of irregular design in the alternative embodiment.

The transmission unit 14a has a support unit 19a. The support unit 19a is configured to shield the receiving element 17a at least in sections against a deformation caused by a mechanical action of force from the outside. The support unit 19a is arranged on an outer circumference of the receiving element 17a. The support unit 19a, when viewed along the central axis 18a of the base body 11a, completely encloses the receiving element 17a/all receiving elements 17a, 47a, 48a over at least a majority of the measuring range 15a/all measuring ranges 15a, 44a, 45a. The support unit 19a has at least one support element 36a. The support unit 19a can have a plurality of support elements 36a. Each of the receiving elements 17a is assigned at least one support element 36a. Each of the receiving elements 17a is protected by a support element 36a. The support element 36a is produced from a rigid material. The support element 36a is formed from a solid material. The support element 36a is formed from the material steel. Alternative materials for the support element 36a are conceivable. The support unit 19a is configured to conduct the fluid from the outside through the support unit 19a to the respective receiving element 17a.

The support element 36a has recesses 26a. The recesses 26a are designed as bores. The support element 36a extends in the measuring range 15a around the receiving element 17a. The support element 36a contacts the receiving element 17a on an outer surface of the receiving element 17a. The recesses 26a are of fluid-permeable design. The recesses 26a are of impermeable design to a solid, in particular a soil material. The support element 36a is configured to provide a fluid pressure to the sensor unit 12a. The support element 36a is configured to shield a mechanical pressure exerted by the soil material from the sensor unit 12a. The support element 36a, when viewed along the central axis 18a of the base body 11a, is shorter than the receiving element 17a.

FIG. 4a shows a schematic sectional view through the sensor device 10a. The hollow body 22a has an inner diameter 52a. The inner diameter 52a is between 4 mm and 14 mm. In the example illustrated in FIG. 4a, the inner diameter 52a of the hollow body 22a is 9 mm. The hollow body 22a has a wall thickness 49a. The wall thickness 49a is between 2 mm and 4 mm. In the example illustrated in FIG. 4a, the wall thickness 49a of the hollow body 22a is 3 mm. The sensor unit 12a has an outer diameter 51a. The outer diameter 51a is between 5 mm and 50 mm. In the example illustrated in FIG. 4a, the outer diameter 51a is 14 a mm. The sensor unit 12a has a wall thickness 50a. The wall thickness 50a is approximately 1 mm. The compensation element 20a has an outer diameter 53a of the plastic sheath 43a. The outer diameter 53a is between 50 µm and 900 µm. The compensation element 20a has an outer diameter 54a of the glass fiber (cladding) 42a. The outer diameter 54a is between 10 µm and 100 µm.

FIG. 4b shows a section through an alternative embodiment of the sensor device 10a. The sensor device 10a has a sensor unit 12a. The sensor device 10a has a main body 11a. The main body 11a is formed from an elastic solid body. In the alternative embodiment, the sensor unit 12a is arranged directly on the solid body. The solid body is formed from a completely compressible material.

FIG. 5 shows a schematic illustration of the sensor device 10a with a segmental arrangement of receiving elements 17a, 47a, 48a. Intermediate ranges 55a, 56a without transmission units are arranged between the regions with receiving elements 17a, 47a, 48a (the measuring ranges 15a, 44a, 45a). In the intermediate ranges 55a, 56a without transmission units, an earth pressure additionally acts on the sensor unit 12a and thus also on the sensor element 13a. The sensor unit 12a is configured to determine in each case a fluid pressure acting on the at least one sensor element 13a via a deformation of the sensor element 13a by means of a calibration for a location at which the transmission unit 14a is arranged (one of the measuring ranges 15a, 44a, 45a), and a further location arranged along the base body 11a, which is arranged spaced apart from the transmission unit 14a (one of the intermediate ranges 55a, 56a).

FIG. 6 shows schematically the sensor device 10a with the sensor unit 12a, wherein the sensor unit 12a has a further sensor element 57a in addition to the sensor element 13a. The further sensor element 57a likewise extends in the measuring range 15a. The further sensor element 57a likewise extends along the longitudinal extension of the base body 11a in a helical manner around the base body 11a. The further sensor element 57a has a fibre parameter which is different from the sensor element 13a. The fibre parameter is configured as a lay length 58a, 59a. The sensor element 13a has a first lay length 58a. The further sensor element 57a has a second lay length 59a. The first lay length 58a and the second lay length 59a are different from one another. The fibre parameters of the sensor elements 13a, 57a differ by the angle with respect to the circumferential direction. The fibre parameters of the sensor elements 13a, 57a differ by a pitch angle. The sensor elements 13a, 57a are arranged such that the sensor elements 13a, 57a intersect. It is also conceivable for the sensor elements 13a, 57a to intersect on account of an angular direction which is different from one another with respect to the circumferential direction. It is conceivable for the sensor elements 13a, 57a to have an identical lay length 58a, 59a, but to be offset longitudinally by a fraction of the lay length 58a, 59a. It is conceivable for the sensor elements 13a, 57a to have further different fiber parameters.

FIG. 7 shows a schematic flow diagram of a method for manufacturing a sensor device 10a. The method for manufacturing the sensor device 10a comprises an extrusion method. Alternatively, manufacture by means of a pultrusion process is also conceivable. It is conceivable for the entire sensor device to be manufactured in a chained extrusion process. However, parts of the sensor device can also be manufactured separately. In any case, at least the base body 11a is manufactured in an extrusion process. Depending on the design of the base body 11a, the latter can also be manufactured in a coextrusion process. In at least one extrusion process step 28a of the method for manufacturing the sensor device 10a, a plastic raw material for manufacturing the base body 11a is provided to an extrusion die (not illustrated). In the extrusion process step 28a, the plastic raw material is provided to the extrusion die at an extrusion temperature. In the embodiment of an interior 24a of the base body 11a which is filled with foam, two materials are alternatively provided to the extrusion die at the extrusion temperature. In the extrusion process step 28a, the compensation element 20a is provided. The compensation element 20a is already prefabricated. In at least one further extrusion process step 29a, the plastic raw material is pressed through the extrusion die at the extrusion temperature and is thus brought into the shape of the hollow body 22a. It is conceivable for at least two different plastics, in particular the hollow body 22a composed of plastic and the filling of the interior 24a of the base body 11a with a foam, to be manufactured simultaneously in the extrusion process step 29a in a coextrusion process. During the shaping of the hollow body 22a, an adhesion promoter can be used at the contact surfaces between the different materials. In the extrusion process step 29a, the prefabricated compensation element 20a is also introduced during the extrusion of the base body 11a. For this purpose, the compensation element 20a is entrained in the extrusion process step 29a at a manufacturing speed of the hollow body 22a.

In at least one further process step 30a of the method for manufacturing the sensor device 10a, the extruded base body 11a is cooled. In at least one further process step 31a of the method for manufacturing the sensor device 10a, the sensor element 13a is applied helically to the outer surface of the base body 11a. For this purpose, an already prefabricated sensor element 13a wound in a helical manner is pulled on. In an alternative method step, the sensor element 13a could also be applied directly helically to the base body 11a by rotation of the tool as a function of the extrusion speed. In this method embodiment, the extrusion die could be in the form of a radial or axial helical distributor. In at least one further extrusion step 32a of the method for manufacturing the sensor device 10a, the casing element 25a is extruded over the sensor element 13a in an extrusion process on a further extrusion die. In at least one method step 33a of the method for manufacturing the sensor device 10a, the extruded casing element 25a is cooled.

In at least one further method step 34a of the method for manufacturing the sensor device 10a, the receiving element 17a is applied externally to the sensor unit 12a. In the method step 34a, the receiving element 17a is slit and pulled over the sensor unit 12a. In one embodiment, the slit could be adhesively bonded. The receiving element 17a could also remain in the slit state. In one embodiment, a plurality of receiving elements 17a, 47a, 48a could be applied to the main body 11a. The receiving elements 17a, 47a, 48a can be applied at regular intervals, but also at irregular intervals. The receiving elements 17a are prefabricated here. Alternatively, an extrusion of the receiving element 17a onto the sensor unit 12a is also conceivable. In at least one further method step 35a of the method for manufacturing the sensor device 10a, the support element 36a of the support unit 19a is attached to the outer circumference of the receiving element 17a. In the method step 35a, the support element 36a is pulled over the receiving element 17a. In the method step 35a, the support element 36a is pulled over the sensor unit 12a. For this purpose, the support element 36a could be mounted in two parts, for example, and then cohesively connected. The support element 36a or its starting parts are prefabricated. In at least one further method step 37a, a connection element (not illustrated) for the evaluation unit 21a is applied to one end of the sensor device 10a.

A further exemplary embodiment of the invention is shown in FIGS. 8 to 10. The following descriptions are limited substantially to the differences between the exemplary embodiments, wherein reference can be made to the description of the exemplary embodiment of FIGS. 1 to 7 with regard to components, features and functions remaining the same. To distinguish between the exemplary embodiments, the letter a in the reference numerals of the exemplary embodiment in FIGS. 1 to 7 is replaced by the letter b in the reference numerals of the exemplary embodiment of FIGS. 8 to 10. In principle, reference can also be made to the drawings and/or the description of the exemplary embodiment of FIGS. 1 to 7 with regard to components having the same designation, in particular with regard to components having the same reference numerals.

FIG. 8 shows schematically a sensor system 27b. The sensor system 27b has a sensor device 10b. In the case illustrated in FIG. 8, the sensor system has a sensor device 10b by way of example. The sensor device 10b forms a spatially resolved pressure sensor. The sensor device 10b is configured to measure a fluid pressure in a soil 16b. The sensor device 10b is configured to measure fluid pressure changes in the ground 16b. The sensor device 10b is configured to be used for measuring earth pressure changes and/or earth pressure-independent fluid pressure changes. The sensor device 10b can be laid in the soil 16b in the horizontal direction 40b. The sensor device 10b illustrated in FIG. 8 is buried under a surface of the soil by way of example in the horizontal direction 40b. The sensor device 10b is provided here by way of example for an application in the case of a river dam 60b. However, another application which appears expedient to a person skilled in the art would also be conceivable. The river dam 60b runs, in particular, parallel to a river 61b and is formed by an earth wall. The river dam 60b has a main extension direction 62b which runs parallel to a flow direction of the flow 61b. The sensor device 10b is laid in meanders by way of example. However, another laying method which appears expedient to a person skilled in the art would also be conceivable. It would also be conceivable, for example, for the sensor device 10*b* to be laid in a straight line, either parallel or perpendicular to a main extension direction 62*b* of the river dam 60*b*. The sensor device 10*b* can be laid vertically and horizontally in the soil 16*b*. The sensor device 10*b* can be laid in curves or arcs. The sensor device 10*b* is of flexurally slack design. The sensor system 27*b* has an evaluation unit 21*b*. The evaluation unit 21*b* is configured to receive and to evaluate the measurement signal from the sensor device 10*b*. The evaluation unit 21*b* is configured to determine the fluid pressure in the soil 16*b* via a distributed glass fibre scanning. The sensor system 27*b* is configured to detect a failure of the river dam 60*b*. The sensor system 27*b* is preferably configured to determine a change in a seepage line in the river dam 60*b*.

FIG. 9 shows schematically a partial detail of the sensor device 10*b*. The sensor device 10*b* is configured to measure the fluid pressure. The sensor device 10*b* has a main body 11*b*. The main body 11*b* comprises a hollow body 22*b*. The hollow body 22*b* is of tubular shape. The hollow body 22*b* is formed from an elastic material. The hollow body 22*b* is designed to be dimensionally stable. The hollow body 22*b* is formed from a plastic. The hollow body 22*b* forms an interior 24*b*. The main body 11*b* comprises a filling element 23*b*. The filling element 23*b* is arranged in the interior 24*b* of the hollow body 22*b*. The filling element 23*b* is formed from a fibrous material, in particular aramid. Alternative configurations of the filling element 23*b*, such as, for example, a foam or a gel, are conceivable.

The sensor device 10*b* has a sensor unit 12*b*. The sensor unit 12*b* forms a location-distributed strain sensor. The evaluation unit 21*b* is configured to determine the fluid pressure as a function of a deformation of a sensor element 13*b* of the sensor device 10*b*. The sensor unit 12*b* is in the form of a fibre-optic sensor unit 12*b*. The base body 11*b* is configured to receive the sensor unit 12*b*. The sensor unit 12*b* is arranged on an outer circumference of the base body 11*b*. The sensor unit 12*b* has at least one sensor element 13*b*. The sensor unit 12*b* has three sensor elements 13*b* by way of example. The sensor elements 13*b* are in the form of light-conducting fibers. The sensor elements 13*b* are in the form of a glass fiber and/or in the form of a bend-optimized fiber. The sensor elements 13*b* are arranged in a helical manner on the outer circumference of the base body 11*b*. The sensor elements 13*b* extend along a longitudinal direction of the base body 11*b* in a helical manner around the base body 11*b*.

The sensor element 13*b* is configured to provide a measurement signal for measuring the fluid pressure. The sensor element 13*b* generates a measurement signal when a fluid pressure is applied and the sensor element 13*b* is compressed or expanded by the fluid pressure and/or the earth pressure. The sensor element 13*b* is connected to the base body 11*b* in a force-fitting manner. Alternatively or additionally, the sensor element 13*b* can be connected to the base body 11*b* in a form-fitting manner. The sensor element 13*b* is of elastically deformable design. The base body 11*b* and the sensor element 13*b* are jointly of elastic form. The sensor unit 12*b* has a casing element 25*b*. The casing element 25*b* is formed from a thermoplastic elastomer. The casing element 25*b* is of elastically deformable design. The casing element 25*b* and the sensor element 13*b* are jointly of elastic form. The casing element 25*b* encases the base body 11*b*. The casing element 25*b* encases the sensor element 13*b*. The casing element 25*b* is configured to protect the sensor element 13*b* against dirt and/or damage and/or corrosion etc. The casing element 25*b* is configured to transmit the fluid pressure to the sensor element 13*b*. The casing element 25*b* is of water-impermeable design.

The sensor device 10*b* has a compensation element 20*b*. The compensation element 20*b* is in the form of a light-conducting fiber. The compensation element 20*b* is in the form of a DTS temperature sensor. In an alternative embodiment, the compensation element 20*b* could be in the form of a DSS strain sensor.

Furthermore, the sensor device 10*b* has a transmission unit 14*b*. The transmission unit 14*b* is configured to receive a fluid from an environment of the sensor device 10*b*, for example a soil in which the sensor device 10*b* is buried, and to transmit said fluid to the sensor unit 12*b* in an insulated manner. The transmission unit 14*b* is configured to filter out a fluid from an environment of the sensor device 10*b*, for example a soil in which the sensor device 10*b* is buried, and to transmit said fluid to the sensor unit 12*b* in an insulated manner. The transmission unit 14*b* is configured to transmit a fluid pressure to the sensor unit 12*b* independently of an earth pressure. The transmission unit 14*b* is configured to transmit the fluid pressure to the sensor unit 12*b* for a deformation of the sensor element 13*b*. The transmission unit 14*b* is arranged around the base body 11*b*. The transmission unit 14*b* is arranged around the sensor element 13*b*. The transmission unit 14*b* is arranged around the casing element 25*b*. The transmission unit 14*b* is arranged at least partially spaced apart radially around the sensor unit 12*b*. The transmission unit 14*b* forms a measuring range 15*b*. The measuring range 15*b* forms a region in which the fluid pressure (protected from the earth pressure) can be measured. The transmission unit 14*b* can form a plurality of separate measuring ranges 15*b*. The transmission unit 14*b* is arranged in the measuring range 15*b*. The transmission unit 14*b* defines the extent of the measuring range 15*b*. Outside the transmission unit 14*b*/the measuring range 15*b*, the fluid pressure cannot be measured uninfluenced by the earth pressure. The transmission unit 14*b* forms a protected hollow space 64*b* around the sensor unit 12*b*, into which water can penetrate free of surrounding material, such as in particular soil.

The transmission unit 14*b* has a support unit 19*b*. The support unit 19*b* is configured to shield the sensor unit 12*b* at least in sections against deformation caused by a mechanical action of force from the outside. The support unit 19*b* has a tubular element 63*b*. The tubular element 63*b* is formed for example by a rigid hose. The tubular element 63*b* extends spaced apart from the sensor unit 12*b*, coaxially to the sensor unit 12*b*. Furthermore, the transmission unit 14*b* has two spacer elements 65*b*, 66*b*. The spacer elements 65*b*, 66*b* are partially conically shaped with a circular cylindrical basic shape. However, another shaping which appears expedient to a person skilled in the art would also be conceivable. The spacer elements 65*b*, 66*b* consist of a rigid material. The spacer elements 65*b*, 66*b* are each arranged at opposite ends of the tubular element 63*b* and are configured to space apart the tubular element 63*b* in a defined manner from the sensor unit 12*b*. The spacer elements 65*b*, 66*b* are each formed by a sleeve. The spacer elements 65*b*, 66*b* each have a first cylindrical outer contour 67*b*, the diameter of which corresponds to an inner diameter of the tubular element 63*b*. The tubular element 63*b* is each pushed with the ends onto the cylindrical outer contour 67*b* of the spacer elements 65*b*, 66*b*. The cylindrical outer contour 67*b* is each formed by a step in a base body of the end elements 65*b*, 66*b*, with the result that a boundary wall which forms a stop for the tubular element 62b is formed in each case at an axial end of the cylindrical outer contour 67b. Furthermore, the spacer elements 65b, 66b each have a central, axial bore 68b. The axial bore 68b serves for leading through the sensor unit 12b. The axial bore 68b of the spacer elements 65b, 66b in each case has, in an axially outer region, an inner diameter which substantially corresponds to an outer diameter of the sensor unit 12b. The spacer elements 65b, 66b are configured to be sealed with respect to the sensor unit 12b in the outer region of the axial bore 68b so as not to be visible any further, in order to prevent a penetration of dirt. Furthermore, the axial bore 68b of the end elements 65b, 66b in each case has, in an axially inner region, an inner diameter which is greater than an inner diameter of the outer region. The inner region of the axial bore 68b of the spacer elements 65b, 66b in each case faces the hollow space 64b. The axial bore 68b in the inner region has, in particular, a spacing with respect to the sensor unit 12b which enables water guidance. Furthermore, the spacer elements 65b, 66b each have a radial bore 69b which opens into an inner region of the respective axial bore 68b.

The transmission unit 14b has at least one receiving element 17b. The transmission unit 14b has two receiving elements 17b by way of example. However, another number of receiving elements 17b which appears expedient to a person skilled in the art would also be conceivable. The receiving elements 17b are each formed by a filter. The receiving elements 17b each have a porous permeability of more than $10^{-4}$ m/s. The receiving elements 17b are configured to receive and to let through a fluid. The receiving elements 17b are configured to pass on and/or to transmit the fluid pressure to the sensor unit 12b, in particular the casing element 25b. The receiving elements 17b are each arranged in, in front of or behind the recesses 70b of the support unit 19b. The recesses 70b are each formed by apertures which connect an environment to the protected hollow space 64b. The receiving elements 17b are each arranged in one of the radial bores 69b by way of example. Alternatively, it would also be conceivable for the receiving elements 17b to be arranged in or behind the recesses 70b in the tubular element 63b, as indicated by dashed lines in FIG. 9. In this case, the recesses 70b can have different shapes and dimensions, wherein each of the recesses 70b is closed in each case by one of the receiving elements 17b. Fluid, in particular water, can penetrate into the hollow space 64b separately from a soil via the receiving elements 17b. The fluid, in particular water, can penetrate into the hollow space 64b through the receiving elements 17b, via the radial bore 69b and via the inner region of the axial bore 68b. As a result, the same fluid pressure as in an environment of the transmission unit 14b, but not the same earth pressure, prevails in the hollow space 64b.

The sensor device 10b has a segmental arrangement of transmission units 14b. Intermediate ranges 55b, 56b without transmission units 14b are arranged between the regions with the transmission units 14b. In the intermediate ranges 55b, 56b without transmission units 14b, an earth pressure additionally acts on the sensor unit 12b and thus also on the sensor element 13b. The sensor unit 12b is configured to determine in each case a fluid pressure acting on the at least one sensor element 13b via a deformation of the sensor element 13b by means of a calibration for a location at which the transmission unit 14b is arranged, and a further location arranged along the base body 11b, which is arranged spaced apart from the transmission unit 14b.

The invention claimed is:

1. A sensor device at least for measuring a fluid pressure, having a base body and having a fibre-optic sensor unit which comprises at least one sensor element which is in the form of a light-conducting fibre and which extends along a longitudinal extension of the base body at least in sections at least substantially helically around the base body, the sensor device further having a transmission unit which is arranged in at least one measuring range around the base body and the at least one sensor element and is configured to receive a fluid from an environment and to transmit a fluid pressure to the fibre-optic sensor unit for deformation of the at least one sensor element,
    wherein the at least one measuring range is designed as a region of the at least one sensor element in which the fluid pressure is detected,
    wherein the transmission unit comprises at least one receiving element which is formed from a porous material and a support unit, wherein the support unit is configured to shield the at least one receiving element at least in regions against deformation caused by a mechanical action of force from an outside of the transmission unit,
    wherein the support unit is configured to conduct the fluid from the outside through the support unit to the at least one receiving element,
    wherein the support unit is provided with recesses which are permeable only to fluids,
    wherein the at least one receiving element is permeable for the fluid.

2. The sensor device according to claim 1, wherein the transmission unit comprises the at least one receiving element which, when viewed along a central axis of the base body, at least for the most part encloses the base body and the at least one sensor element in the at least one measuring range.

3. The sensor device according to claim 1, wherein the transmission unit abuts against the fibre-optic sensor unit.

4. The sensor device according to claim 1, wherein the base body and the at least one sensor element are connected to one another in a force-fitting and/or form-fitting manner and are jointly at least of elastic form.

5. The sensor device according to claim 1, wherein the support unit, when viewed along a central axis of the base body, at least for the most part encloses the at least one receiving element over at least a majority of the at least one measuring range.

6. The sensor device according to claim 5 wherein the support unit comprises at least one support element which is formed from a solid material.

7. The sensor device according to claim 1, wherein the transmission unit forms a protected hollow space around the fibre-optic sensor unit, into which water can penetrate free of surrounding material.

8. The sensor device according to claim 7, wherein the at least one receiving element is formed by a filter, wherein the fluid can penetrate into the protected hollow space separately from the surrounding material via the at least one receiving element.

9. The sensor device according to claim 1, wherein the fibre-optic sensor unit forms a location-distributed strain sensor.

10. The sensor device according to claim 1, further comprising a compensation element which is formed as a light-conducting fibre, is arranged in or on the base body and extends at least substantially parallel to the longitudinal extension of the base body or runs helically.

11. The sensor device according to claim 1, wherein the transmission unit comprises a plurality of receiving elements including the at least one receiving element which are distributed along the longitudinal extension of the base body.

12. The sensor device according to claim 1, wherein the fibre-optic sensor unit comprises at least one further sensor element which is formed as a light-conducting fibre, extends at least substantially helically around the base body at least in the at least one measuring range along the longitudinal extension of the base body and has at least one fibre parameter which is different from the at least one sensor element.

13. A sensor system for measuring a fluid pressure, having at least the sensor device according to claim 1 and having an evaluation unit for determining the fluid pressure as a function of a deformation of the at least one sensor element of the sensor device, wherein the evaluation unit is configured to determine the fluid pressure by means of the at least one sensor element via a distributed glass fibre scanning.

14. A method of using a sensor device and/or a sensor system having the sensor device, comprising:

a step of using the sensor device according to claim 1 and/or a sensor system having the sensor device according to claim 1 for measuring fluid pressure changes and/or earth pressure changes, and a step of measuring a change in a water pressure in soil as a result of erosion using the sensor device.

15. A method for manufacturing a sensor device, comprising:

a step of manufacturing the sensor device according to claim 1, including manufacturing the base body of the sensor device in an extrusion process.

16. A method for manufacturing a sensor device, comprising:

a step of manufacturing the sensor device at least according to claim 10, including manufacturing at least the base body in an extrusion process, and a step of introducing, during the extrusion process of the base body, the compensation element.

\* \* \* \* \*